(12) United States Patent
Seward et al.

(10) Patent No.: US 11,526,654 B2
(45) Date of Patent: Dec. 13, 2022

(54) READING PROFICIENCY SYSTEM AND METHOD

(71) Applicant: See Word Design, LLC, Cincinnati, OH (US)

(72) Inventors: Reneé Seward, Cincinnati, OH (US); Oscar Fernández, Plain City, OH (US); Akshat Srivastava, San Jose, CA (US); Frida Estefanía Medrano García, San Nicolás de los Garza (MX)

(73) Assignee: See Word Design, LLC, Cincinnati, OH (US)

( * ) Notice: Subject to any disclaimer, the term of this patent is extended or adjusted under 35 U.S.C. 154(b) by 0 days.

(21) Appl. No.: 16/938,754

(22) Filed: Jul. 24, 2020

(65) Prior Publication Data

US 2021/0027008 A1 Jan. 28, 2021

Related U.S. Application Data

(60) Provisional application No. 62/879,280, filed on Jul. 26, 2019.

(51) Int. Cl.
| | |
|---|---|
| *G06F 17/00* | (2019.01) |
| *G06F 40/109* | (2020.01) |
| *G06F 40/20* | (2020.01) |

(52) U.S. Cl.
CPC ............ *G06F 40/109* (2020.01); *G06F 40/20* (2020.01)

(58) Field of Classification Search
CPC ........ G06F 40/109; G06F 40/20; G09B 1/003
See application file for complete search history.

(56) References Cited

U.S. PATENT DOCUMENTS

| | | | |
|---|---|---|---|
| 6,230,135 B1 * | 5/2001 | Ramsay | G09B 21/001 704/271 |
| 6,704,116 B1 * | 3/2004 | Abulhab | G06F 40/129 358/1.9 |
| 6,796,798 B1 * | 9/2004 | Sanocki | G09B 17/00 434/156 |

(Continued)

FOREIGN PATENT DOCUMENTS

| | | |
|---|---|---|
| WO | 2009092139 A1 | 7/2009 |
| WO | WO-2009092139 A1 * | 7/2009 ............. G09B 19/04 |

OTHER PUBLICATIONS

International Search Report and the Written Opinion of the International Searching Authority issued in International Application No. PCT/US2020/043586, dated Oct. 1, 2020, 9 pages in its entirety.

(Continued)

*Primary Examiner* — Laurie A Ries
(74) *Attorney, Agent, or Firm* — Ulmer & Berne LLP

(57) ABSTRACT

A method for improving reading proficiency in persons in need of improvement. The method includes the steps of providing a body of digital text on an electronic device; extracting a selected portion of digital text from the body of digital text; analyzing the selected portion by natural language processing to produce a phonetical font, the phonetical font including a representation of a letter that when heard or said voices a phoneme of the letter; rendering the analyzed selected portion into the phonetical font; and utilizing the phonetical font to increase reading proficiency.

20 Claims, 23 Drawing Sheets

(56) References Cited

U.S. PATENT DOCUMENTS

| | | | |
|---|---|---|---|
| 7,181,692 B2* | 2/2007 | Siegel | G09B 5/065 715/706 |
| 2005/0060138 A1* | 3/2005 | Wang | G06F 3/018 704/1 |
| 2006/0179189 A1* | 8/2006 | Lin | G06F 40/109 710/67 |
| 2011/0123967 A1* | 5/2011 | Perronnin | G09B 17/006 434/178 |
| 2012/0035909 A1* | 2/2012 | Engelsen | G09B 19/04 704/E11.001 |
| 2012/0035910 A1* | 2/2012 | Awaida | G06F 40/109 704/5 |
| 2013/0031454 A1* | 1/2013 | Griffiths | G06F 40/143 715/230 |
| 2013/0224697 A1* | 8/2013 | McCallum | G09B 7/04 434/188 |
| 2014/0222413 A1* | 8/2014 | Rossmann | G06F 40/58 704/3 |
| 2015/0127339 A1* | 5/2015 | Tjalve | G10L 15/187 704/235 |
| 2018/0268038 A1* | 9/2018 | Keyngnaert | G06F 16/24578 |

OTHER PUBLICATIONS

Seward, Reneé, Reading by Design Visualizing Phonemic Sounds for Dyslexic Readers 9-11 Years old, Thesis Submitted to North Carolina State University College of Design Master's of Graphic Design program committee, May 7, 2007, 64 pages, Raleigh, NC, USA.

* cited by examiner

Glyph/Icon Inventory

| | 1 | 2 | 3 | | 1 | 2 | 3 |
|---|---|---|---|---|---|---|---|
| ā | | | | m | 🜛 | 🜛 | 🜛 |
| ă | a | ⚓ | 🜛 | n | 🜛 | 🜛 | 🜛 |
| b | 🜛 | 🜛 | 🜛 | ō | | | |
| c | 🜛 | | | ŏ | 🜛 | 🜛 | 🜛 |
| d | | | | p | 🜛 | 🜛 | 🜛 |
| ē | 👂 | 🦅 | 🪱 | q | 🐦 | 👸 | |
| e | 🜛 | | | r | | | |
| f | 🐝 | 🜛 | 🐸 | s | | | |
| g | | | | t | 🦷 | 🐢 | 🜛 |
| h | 🜛 | 🜛 | 🦛 | ū | | | |
| ī | 🧊 | 🍦 | 🜛 | ŭ | | | |
| ĭ | | 🜛 | 🦎 | v | | | |
| j | | | | w | | | |
| k | 🔑 | 🜛 | 🜛 | x | | | |
| l | | | | y | | | |
| | | | | z | | | |

FIG. 23

READING PROFICIENCY SYSTEM AND METHOD

CROSS-REFERENCE TO RELATED APPLICATION

This application claims the benefit of U.S. provisional patent application Ser. No. 62/879,280, filed on Jul. 26, 2019, the disclosure of which is incorporated herein by reference in its entirety.

BACKGROUND

Learning to read is a rewarding yet challenging process for many students. One in three fourth-grade students cannot read at a basic level. Moreover, 32% of fourth-graders and 24% of eighth-graders in the U.S. cannot read at the basic level. Most of the approximate 2.6 million children who received special education services for specific learning disabilities between 2006 and 2007 had reading difficulties. Additionally, minority students and children of low socio-economic status make up most of those receiving special education services.

In Adults low literacy rates create insurmountable barriers for individuals for economic mobility, increased crime and healthcare costs. These individuals cannot read instructions for the medication, notices from the IRS or welfare department. Over $230B/year in healthcare costs are attributed to the fact that almost half of American's cannot read well enough to comprehend health information. (American Journal of Public Health). They can't complete job applications or follow basic safety instructions listed on a product they just purchased. Because of the difficulty in reading and writing, individuals lack the necessary skills to meet current market requirements for employers seeking skilled labor, resulting in labor shortages for organizations. As a result, everyone is impacted.

Starting to learn to read in early childhood is believed to be key to increasing reading proficiency. However, for many struggling readers written letters offer few meaningful clues to suggest how to decode words which is critical to build a foundation for reading comprehension.

BRIEF DESCRIPTION OF THE DRAWINGS

The following detailed description of embodiments of the present disclosure can be best understood when read in conjunction with the drawings enclosed herewith:

FIG. 23 is representation of an example glyph/icon inventory according to one embodiment of the disclosure;

Figure 1:
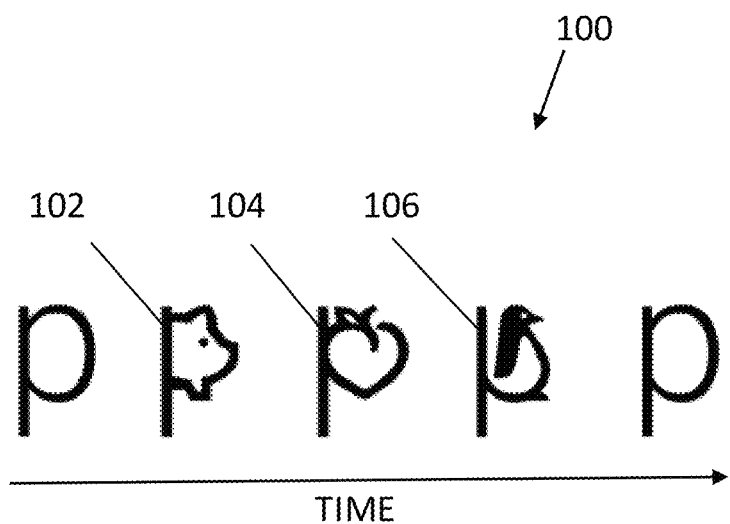
FIG. 1 is a representation of an example phonetical font for the letter "p" according to one embodiment of the disclosure.

The embodiments set forth in the drawings are illustrative in nature and not intended to be limiting. Moreover, individual features of the drawings and the disclosure will be more fully apparent and understood in view of the detailed description.

DETAILED DESCRIPTION

Certain embodiments are hereinafter described in detail in connection with the views and examples of FIGS. 1-27.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific FIG. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Solutions to the problems associated with increasing reading proficiency are disclosed herein. In an embodiment, the disclosure relates to fonts designed to improve reading in early readers. The fonts can be useful for anyone learning to read, including, for example, a non-English speaking individual desiring to learn written English. In an embodiment, the disclosure relates to the fonts described herein being utilized with an application programming interface (API) that can allow any electronically transmitted content to be rendered using the fonts of the present disclosure. In an example, the fonts can be rendered on any electronic device with any technology known for transmitting data, such as by wired or wireless Bluetooth® or internet connection.

Referring now to FIG. 1, there is shown an example of a font referred to herein as a phonetical font 100. Phonetical fonts use visualization, hearing, and touch technology and artificial intelligence to embed at least one associated image within a letterform to cue readers to say, hear, or touch the sound of the letter, which can be its phoneme, by identifying the associated image. As used herein, a phoneme is a unit of sound that distinguishes one letter or letters within a particular language. Thus, a phonetical font can be an image that when voiced by the digital device and/or the one visually perceiving it voices a phoneme of a particular letter or word. Associated images are images that when heard or spoken sound the letter to which it is associated. The reader can think, hear or say the sound of the associated image(s) and thus learn, or have reinforced, the sound of the letter. The phonetical font can pair visual design principles with cognitive research theory to give a new level of accessibility, including interactive involvement, to beginning readers while in the context of reading text. In general, artificial intelligence can be incorporated in any component of the system, including, for example, in an API, as discussed below.

A phonetical font can be glyph combining associated images as icons in combination with a letterform, i.e., the form of a letter. A phonetical font can be a dynamic font that animates phonemes to the glyph representations of the sound of a letter. A phonetical font can include a glyph, such as an image, of a letter that corresponds to a phoneme of the letter. For example, as shown in FIG. 1 for the letter "p," a hard "p" could animate to a letterform having an associated image of a pig icon 104, or a peach icon 106, or a penguin icon 108. In an example system and method, a user can select by a user interaction, such as by touching, clicking, rolling over, or by any other suitable interaction, a letter, such as the letter "p" at 102. Taking "p" as an example (as shown in FIG. 1), upon selection by a user of the hard letter "p" at 102, letter could animate, i.e., morph into a glyph, to a visual representation that the user recognizes, such as one or more of the aforementioned letterforms having an associated image of a pig icon 104, or a peach icon 106, or a penguin icon 108.

In another example system and method, the phonetical font could have embedded a series of images, such as the three images shown in FIG. 1, i.e., a pig, a peach, and a penguin, that animate sequentially in time, as indicated by the time arrow of FIG. 1. Upon selection of the "p", the system can initiate a sequence of images that morph within the letter form the images in a timed, sequential order, of the pig, peach, and the penguin. The user can name the images aloud as they appear, providing visual cues to the letter's sound. Upon hearing the initial sound of the displayed images (or, for some letters such as vowels, the medial sounds), the user can learn the sound the letter makes. The phonetical animation of the glyphs can be accomplished via a set of standard web technologies such as JavaScript, Scalar Vector Graphics, Contextual Chaining and Cascading Style Sheets. In an embodiment, when selected, the phonetical font can allow text to speech so that the sound of the letter can also be audibly provided to the user.

Figure 2:
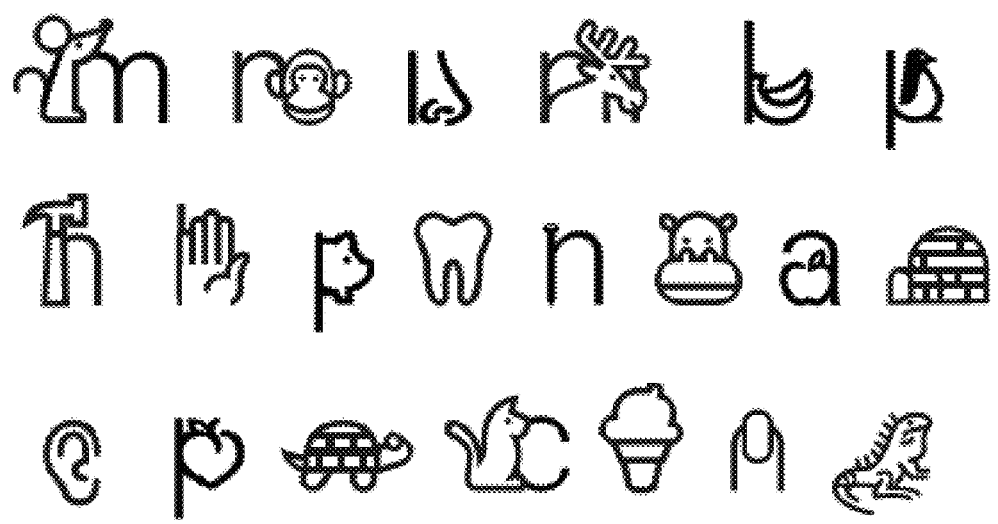
FIG. 2 is a representation of example phonetical fonts showing glyphs of icon/letterform combinations according to one embodiment of the disclosure.

More example phonetical fonts 100 are shown in the glyphs of FIG. 2, specifically, in top to bottom, right to left order: "m" depicting a mouse; "m" depicting a monkey; "n" depicting a nose; "m" depicting a moose; "b" depicting bananas; "h" depicting a hammer; "h" depicting a hand, "p" depicting a pig; "t" depicting a tooth; "n" depicting a nail; "h" depicting a hippo; "a" depicting an apple; "i" depicting an igloo; "e" depicting an ear; "p" depicting a peach; "t" depicting a turtle; "c" depicting a cat; "i" depicting ice cream; "n" depicting a nail; and "i" depicting an iguana.

Figure 3:
FIG. 3 is a representation of consonants according to one embodiment of the disclosure.
Figure 4:
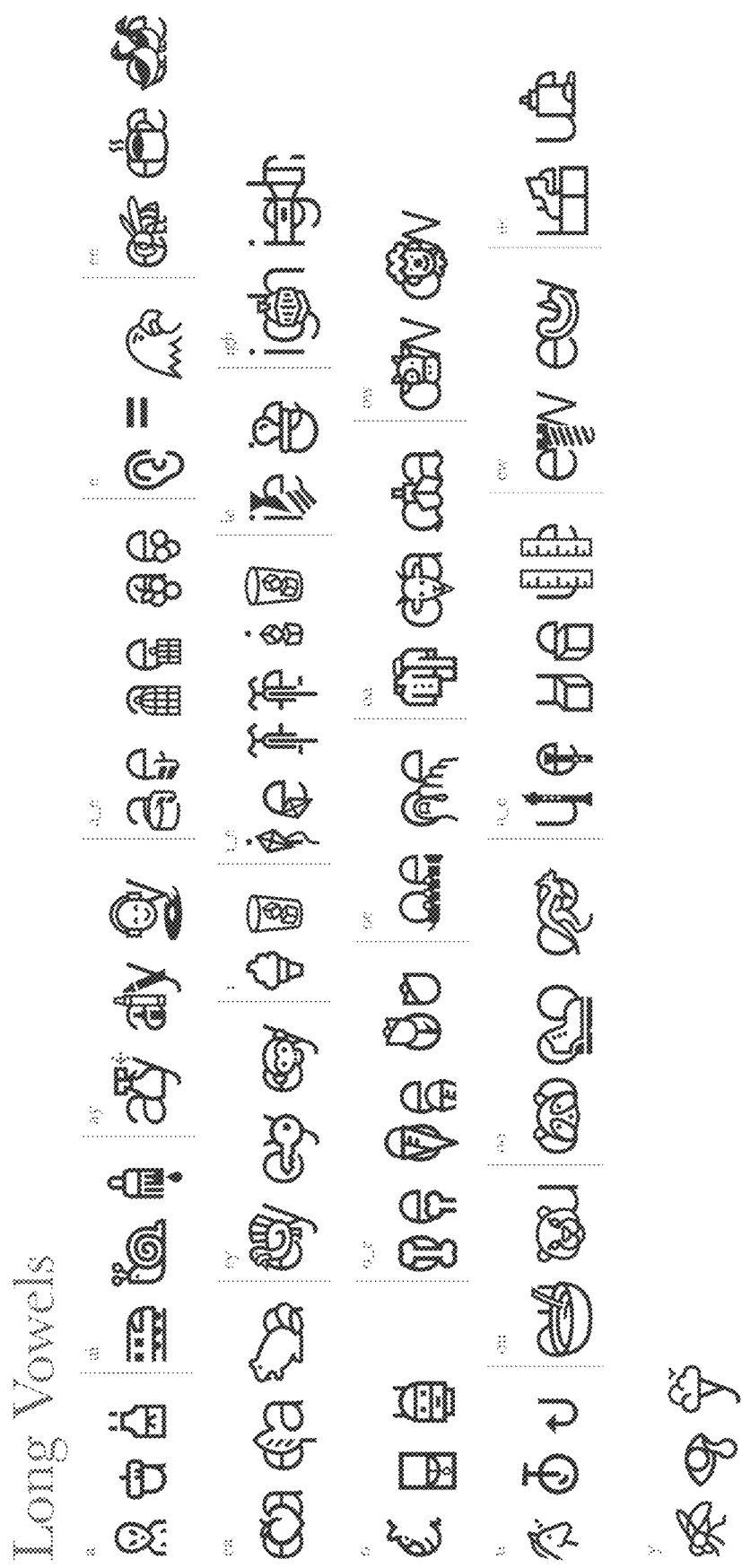
FIG. 4 is a representation of long vowels according to one embodiment of the disclosure.

Thus, as can be understood, a phonetical font can be a dynamic reading glyph that can cue readers to remembering what phonemic sounds letters make by presenting to the reader one, or a timed sequence, i.e., images relating to the sound of the letter phoneme. Phonemes are the sounds of the English language. There are forty-four common phonemic sounds in English. The phonemes can be placed in six categories: consonants, long vowels, diphthongs, digraphs, short vowels, R-controlled vowels. Example phonetical fonts associated with certain of the forty-four phonemic sounds are depicted in FIGS. 3-8. FIG. 3 illustrates example phonetical fonts for consonant phonemic sounds. FIG. 4 illustrates example phonetical fonts for long vowel sounds.

Figure 5:
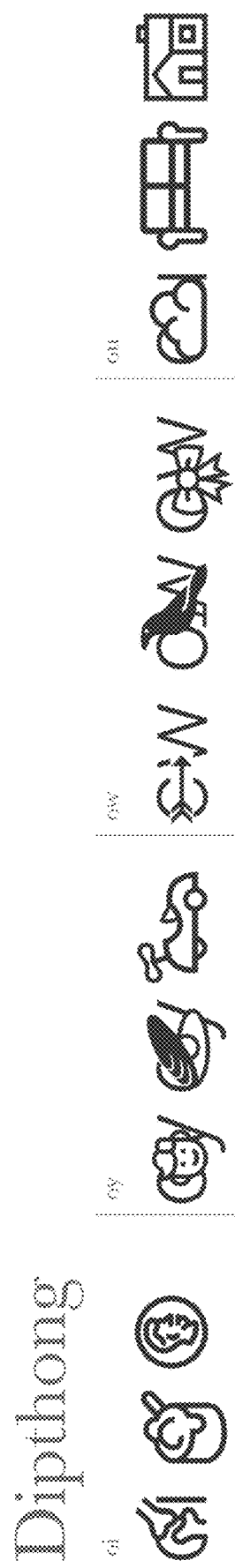
FIG. 5 is a representation of diphthongs according to one embodiment of the disclosure.
Figure 6:
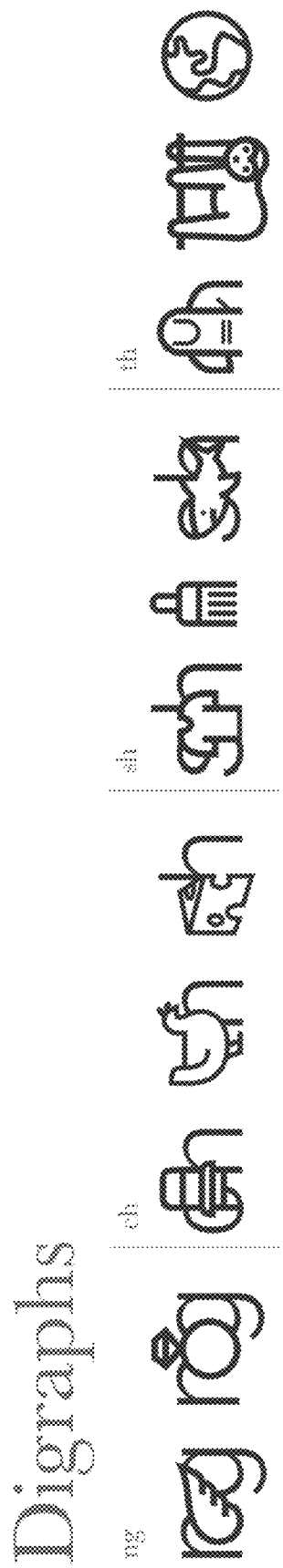
FIG. 6 is a representation of digraphs according to one embodiment of the disclosure.
Figure 7:
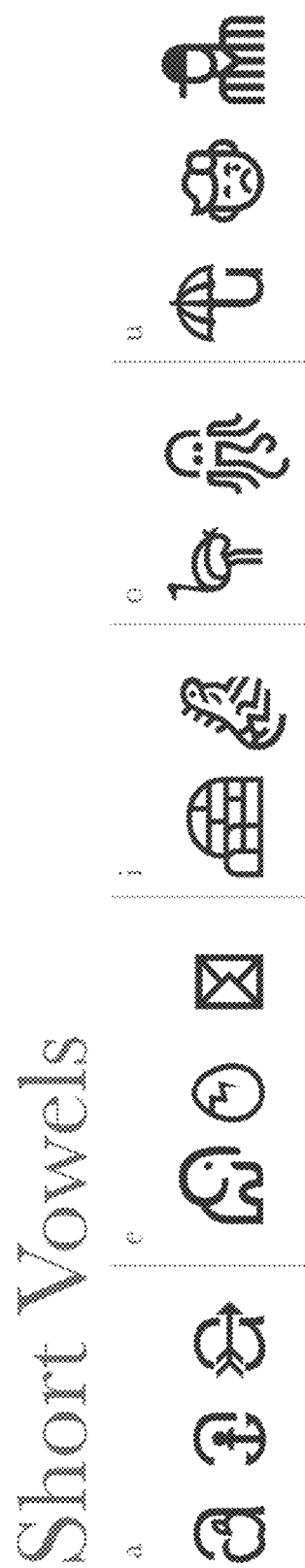
FIG. 7 is a representation of short vowels according to one embodiment of the disclosure.
Figure 8:
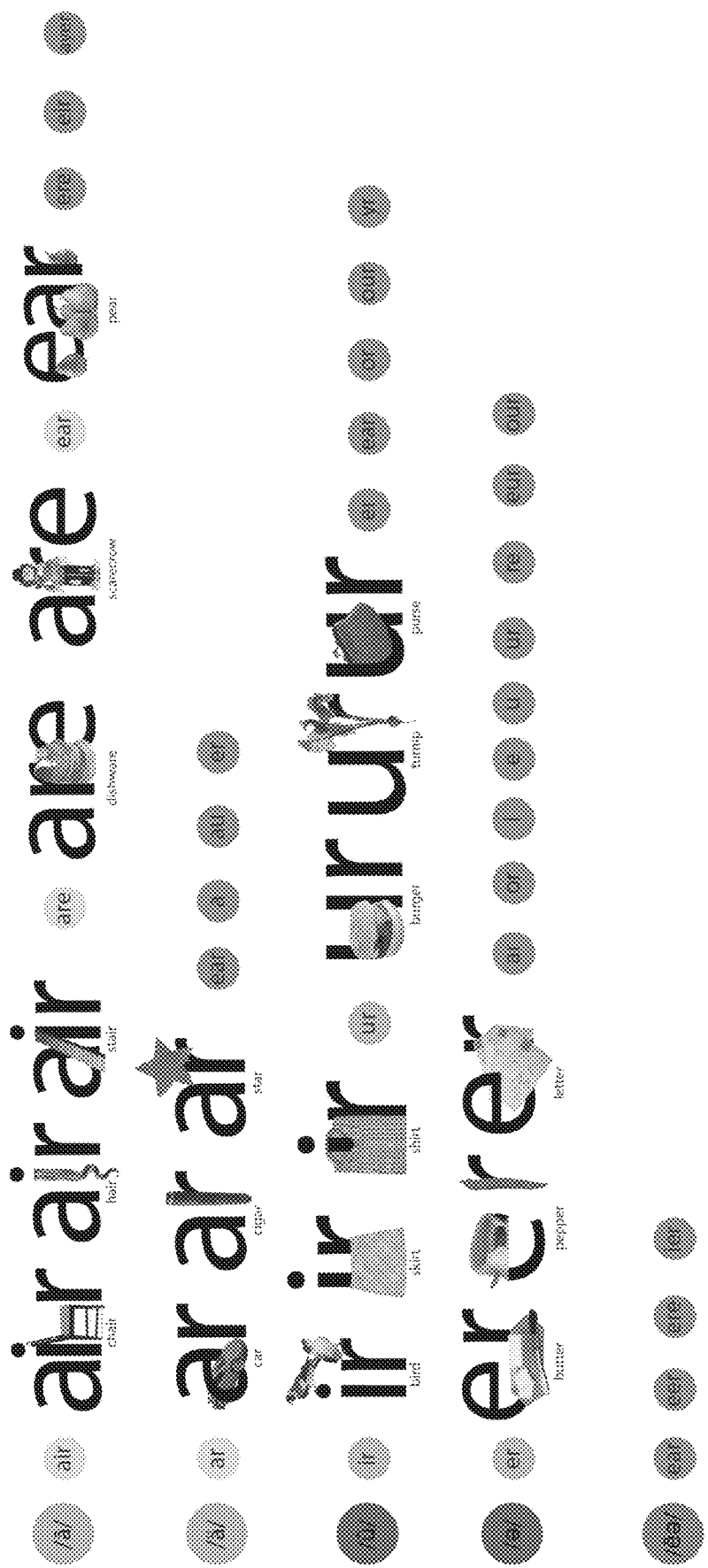
FIG. 8 is a representation of combination letters according to one embodiment of the disclosure.

FIG. 5 illustrates example phonetical fonts for diphthongs. FIG. 6 illustrates example phonetical fonts for digraphs. FIG. 7 illustrates example phonetical fonts for short vowel sounds. FIG. 8 illustrates example R-controlled vowels. As can be understood from the illustrated phonetical fonts of FIGS. 3-8, a phonetical font can be a combination of icons with letterforms, and can be a dynamic font that can interactively animate glyphs related to phonemes to present visual clues to a reader sounding out the letters' phoneme.

In an example method, a reader can identify the glyph representation of the sound, hear and say aloud the name of the glyph's image to sound the letters sound. In another example system and method, a phonetical font embeds a series of a plurality of images into each phoneme to cue readers to hearing the sound to the letter correspondence. For example, selecting the letter "p" initiates a sequence of images that morphs within the letterform (ex. pig, peach, and penguin) (see, FIG. 1). Naming the images aloud as they appear can cue a reader to hearing the common initial sound of the objects displayed (or the medial sound for some vowels). Repeating the sound with each sequential image reinforces to the user the sound of the letter.

Figure 9:
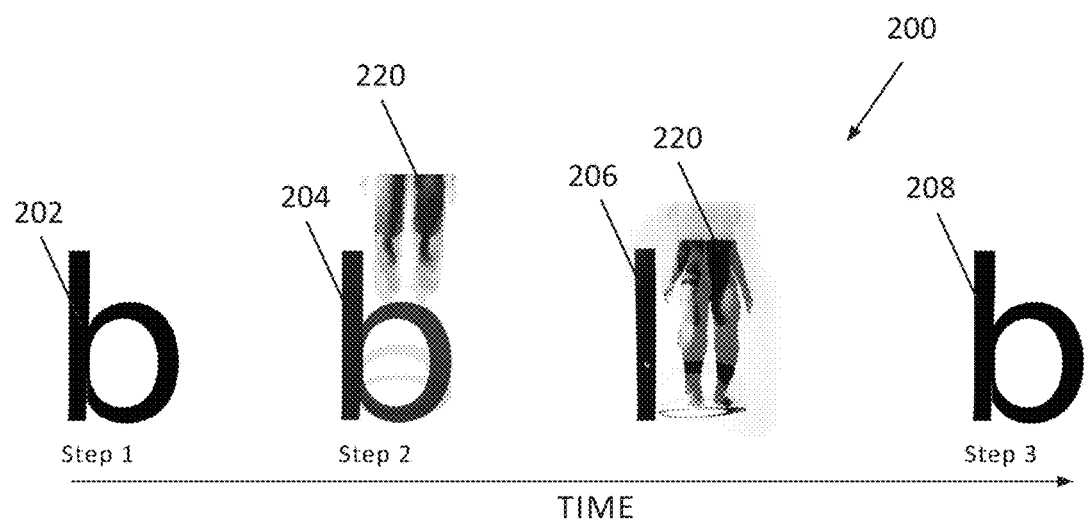
FIG. 9 is a representation of an example dynamic phonetical font for the letter "b" according to one embodiment of the disclosure.
Figure 10:
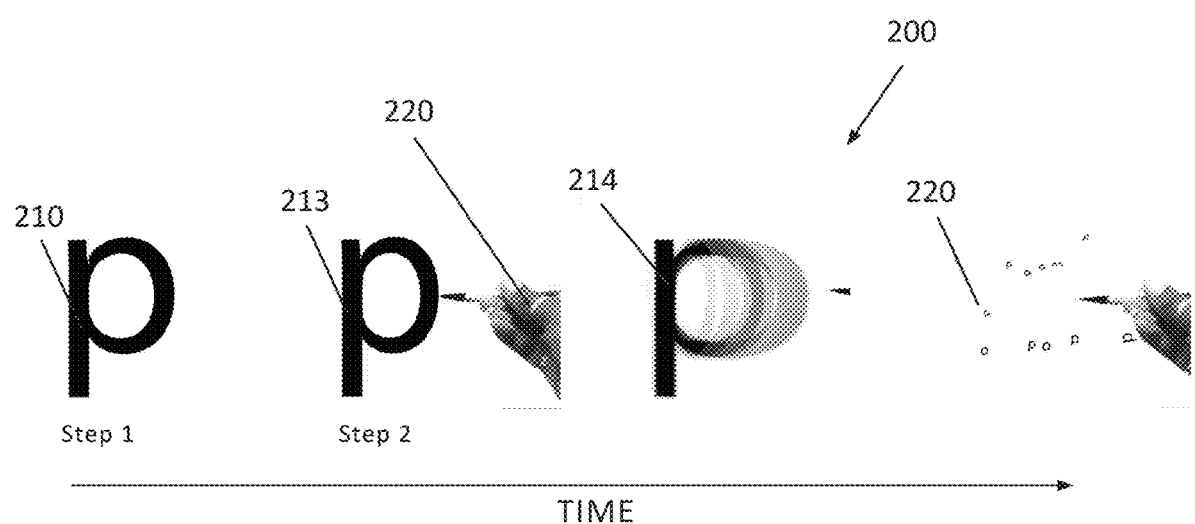
FIG. 10 is a representation of an example dynamic phonetical font for the letter "p" according to one embodiment of the disclosure.

Referring now to FIGS. 9 and 10, there is shown an example of a phonetical font 200 utilizing dynamic images with a letter, the motion of which provides an additional cue to the letter's sound. For example, as shown in FIG. 9, a letter, such as the letter "b" illustrated, can be mapped onto a moving image that, in context, facilitates a reader to recall the phoneme through relational processing. For example, as a reader selects the letter, such as the letter "b" at 202, a moving image, e.g., a video clip, cue can appear and interact with the letterform to build a formal connection through a performative narrative. In this example, when the letter "b" is selected the user could see a moving image of a person 220 bouncing on or near the letter, as depicted in still image story board form in FIG. 9 at 204 and 206. In an embodiment, the user can also hear the sound of a bounce, helping the user to understand and recall the sound. In like manner, as shown in FIG. 10, when the letter "p" is selected at 210 the user could see a moving image of a person 220 popping a "balloon" as part of the letter "p," as depicted in still image story board form at 212 and 214. Likewise, in an embodiment, the user can also hear the sound of a pop, helping the user to understand and recall the sound.

The example phonetical font 200 can facilitate reading proficiency providing (in addition to static images) further visual and/or audible cues to increase the recall of phonemic sounds. In an example system and method learning can be facilitated through the introduction of narrative and interaction. The example phonetical font 200 can utilize combinations of text, image, time, motion, sound, and/or spatial associations to create a context for cueing a phoneme's sound to a user. This approach can give the letters emotional qualities, which can allow readers to have an aesthetic experience while interacting with the letters to learn their phonemes. The additional cues or qualities are given in association with letter symbols that are based on a visual vocabulary, which can, for example, encourage a dyslexic reader to think in pictures. The formal vocabulary can also allow a reader to learn through interactions with time-based narratives, as opposed to learning through rote memorization.

Figure 11:
FIG. 11 depicts example phonetical fonts for certain vowel sounds according to one embodiment of the disclosure.

Referring now to FIG. 11, there is shown an example of a phonetical font 300 utilizing dynamic image modification for learning vowel phonemes. The phonetical font 300 visually emphasizes one or more of the six syllable types within a body of text. The phonetical font 300 utilizes a typeface that can be static or animate make letterforms into images that signal to the reader concretely how to pronounce a word. For example, upon selection of a word, one or more of the vowels can become bold, elongated, or otherwise modified to facilitate the reader to identify what type of sound the vowel makes in context. In general, the system of the present disclosure defines a custom axis that can be manipulated to control rendering of the touch responses by the user. The six syllable types disclosed herein include: (1) Closed. Closed in by a consonant; vowel makes its short sound (e.g. not); (2) Open. Ends in a vowel; vowel makes its long sound (e.g. no); (3) Silent e. Ends in vowel consonant e; vowel makes its long sound (e.g. note); (4) Vowel combination. The two vowels together make a sound (e.g. nail); (5) r-controlled. Contains a vowel plus "r"; vowel sound is changed (e.g. bird); and (6) Consonant—l-e. At the end of a word (e.g. table).

Figure 12:
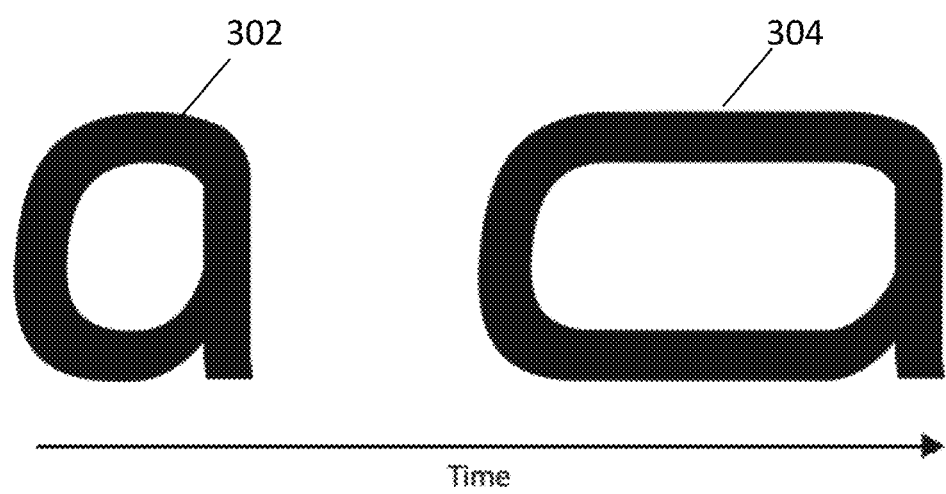
FIG. 12 depicts example phonetical fonts for the long "a" vowel sound according to one embodiment of the disclosure

Continuing to refer to FIG. 11, in an interactive example, selecting a word having a sound that a reader is struggling to decode can activate programmed cue. For example, as shown in FIG. 11, and taking the word "pancake" as representative, upon selection of the word, the first "a" can be represented as relatively shorter in a width dimension than the second "a" which can be indicated as being relatively longer in the width direction. In a further example, as depicted in FIG. 12, when a user selects a vowel, such as an "a" that is a long "a" sound, the letter as presented 302 can, when selected, elongate 304, thereby providing a visual indication of the vowel sound. In a system and method of the disclosure, a user can visualize a relative letter shape or size cue indicating an attribute of the sound of the letter, and the word. It is believed that the use of visual organizational principles such as chunking, hierarchical structuring, spatial segmentation in relation to text content, as incorporated in the examples herein, can improve comprehension and aid recall.

The phonetical font 300 can appeal to a reader's visual-spatial skills. By making the vowel bold and/or shortened/elongated and the consonants regular weights, it can be relatively easier for the reader to identify what types of syllables are in any given word. It is believed that when the syllable types are made visible through the use of graphic cues, it can simplify the process of learning to decode these sounds. With repeated encounters a reader can build orthographic memories of words (i.e., memory of patterns of written language).

Additionally, the phonetical fonts disclosed herein allow a reader to learn while doing through the interaction with letterforms. Also, the dynamic aspects of the typeface, in which the letter changes over time, can reveal patterns among words, thereby helping the reader to understand dependencies. This design element gives the reader a strategy that he/she can use when decoding any word and allows him/her to use relational-processing skill to see patterns within a text.

Figure 13:
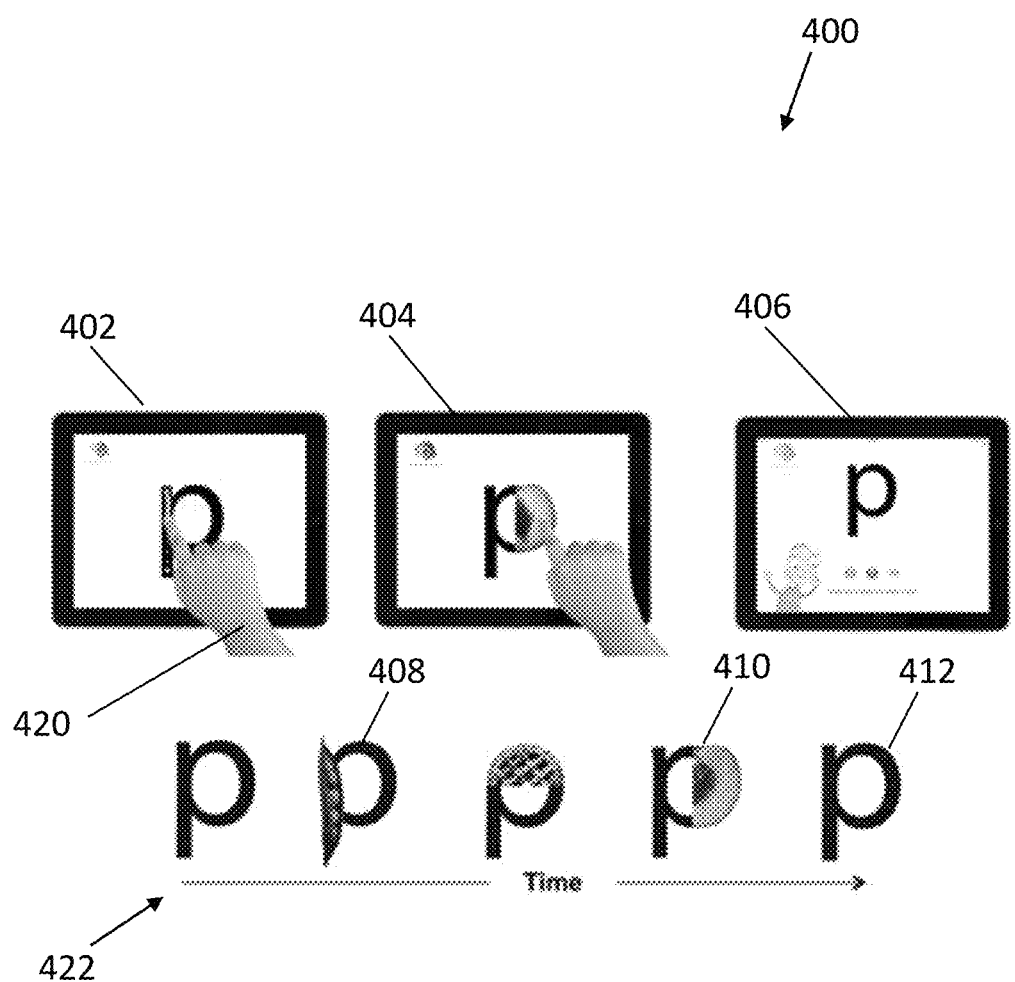
FIG. 13 is a schematic representation of an example electronic device and the use of an app utilizing phonetical fonts according to one embodiment of the disclosure.
Figure 14:
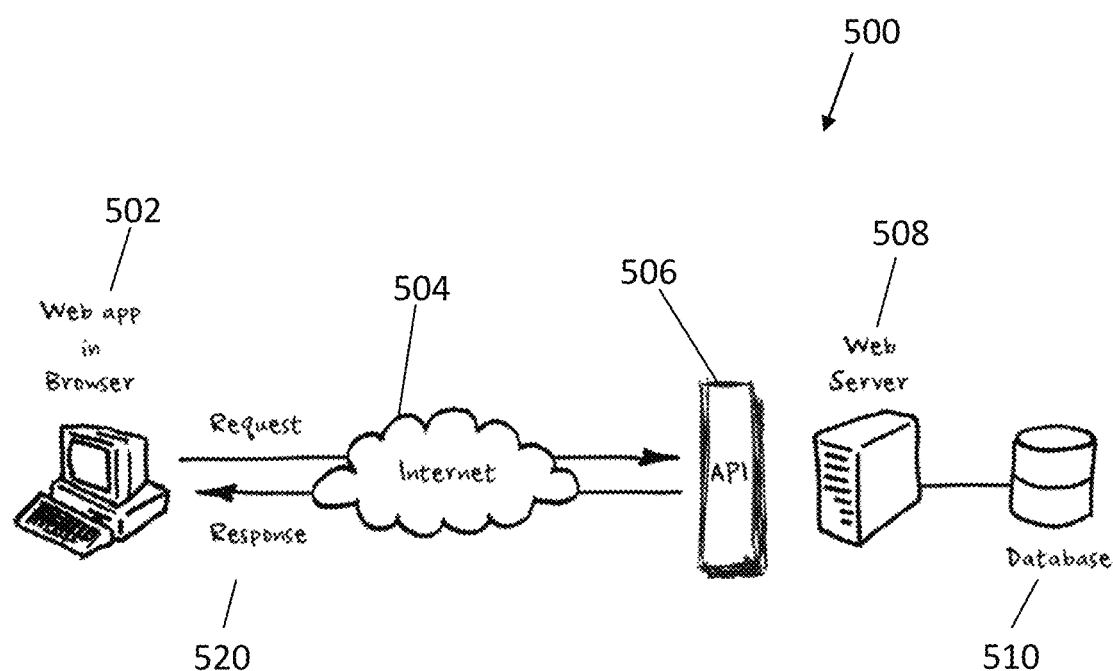
FIG. 14 is a schematic representation of an example phonetical font system according to one embodiment of the disclosure.

Referring now to FIG. 13, there is illustrated one example of an application, i.e., an "app" 400 that can run on an electronic device such as a computer, tablet, smartphone, and the like. The app can be downloaded and reside on the electronic device, or it can reside on a server accessed by the electronic device. The app can run to achieve, among other features, presentation of the phonetical fonts as disclosed herein which can cue students using the app to recall a sound associated with a letter by visual images. As discussed herein, the app can prompt a student to produce the letter sound orally and/or to hear a letter's sound. Letterforms in the app can be dynamic as disclosed above. Additionally, in an example, a series of image cues can superimpose themselves on top of a letter over time in response to a user's interaction. As illustrated in FIG. 14, the app can be interactive such that a student 420 can select, such as by touching a touch screen, a letter prompting a sequence 422 of images to appear superimposed over the touched letter. For example, as shown a student 420 can touch the letter "p" at first screen 402 and draw his or her finger down the long side, at which time the app can cause the image of a peapod to appear, as indicated at 408. The app can superimpose other images depending on the interactive touching of the student, such as a pie superimposed over the round portion of the letter "p" or, as shown at the second screen 404 the representative figure of a peach at 410. Further, at a third screen 406, the app can audibly sound out the letter "p" phoneme, with the image of the letter "p" alone, as shown at 412. Thus, as can be understood, if a student is reading onscreen and cannot recall the sound for the letter 'p', the student can trace the letter on the screen and receive a time-sequenced series of images (which can be photographic images or line drawings, and the like) that begin with the "p" sound such as peapod, peach, and pie, superimposed on the letter. The image cues can be initiated through tracing, tapping, or otherwise selecting the letter, and can create an individualized, interactive learning experience. In an embodiment, students' access cues only as they need them. In an embodiment, the student app can include four levels: Letter-Sound Correspondence, Word Building-Word Family, Word Building-Spelling, and Storybook levels. All student audio and kinesthetic interactions can be recorded. With an associated teacher's app, individualized curriculum can be sent to multiple students and progress can be monitored and reported.

In an embodiment, the system and method of the present disclosure can include an API that can allow any electronic content to be rendered using the phonetical fonts disclosed herein. The API may be configured for a web-based system, computer operating system, database system, computer hardware, and/or software library. In an example, the phonetical fonts can be rendered via the API on any electronic device with any known technology known in the art. In an embodiment, the API can be utilized by developers to deliver the phonetical fonts described herein to a user, such as a student, as a tool for reading development and/or proficiency. The API can be a publicly accessible web-based feature that can return phonetical font data, for example, in Extensible Markup Language (XML), JavaScript Object Notation (JSON) format, or the like.

Referring to FIG. 14, one example of a system 500 of the disclosure utilizing an API and a method utilizing an API is shown. As shown, by way of example, the API 506 can facilitate communication and data delivery from an app on an electronic device 502 and a server 508 that can access a database 510. The system 500 can operate via the internet 504, with requests 520 from the electronic device 502 to the server 508 via the API 506 being transmitted via internet connections, as is known in the art. The database 510 can store some or all of the various phonetical fonts as described herein.

In general, the API 506 can facilitate requests from an electronic device 502 to retrieve or write data without a frontend (e.g., HTML, CSS), by sending an HTTP request to the server 508. The database 510 and server 508 can operate according to MySQL™, POSTGRES®, or it can be a backend as a service (BaaS) database such as FIREBASE®. The server 508 can be a virtual private server (VPS) accessible to the internet 504, where the app can run. The VPS can utilize DigitalOcean®, Amazon Web Services, Microsoft AZURE®, and the like. The server response can be in Extensible Markup Language (XML), JavaScript Object Notation (JSON) format, or the like.

In an embodiment of the system and method disclosed herein the API can facilitate text-to-speech (TTS). Text processed by the API can be analyzed and broken down by phonetic transcriptions (aka "tokenization") into individual phonemes. TTS algorithms can then match to a database of recorded waveforms resulting in an audio representation of the text. The output of the API text-to-phoneme transcription can be used to match to a set of animated glyphs as disclosed herein which can then rendered to the user's application.

The TTS system can operate based on one or both of two approaches to phonetic transcription: dictionary and rules. The dictionary approach has a high accuracy rate, but is limited to the number of words in the dictionary. The rules approach can be used on any input but can grow to be very complex as the number of rules grow over time. Various heuristic techniques will be used to guess the proper method of disambiguating phonemes. In an embodiment, the API can utilize various artificial intelligence solutions.

Figure 15:
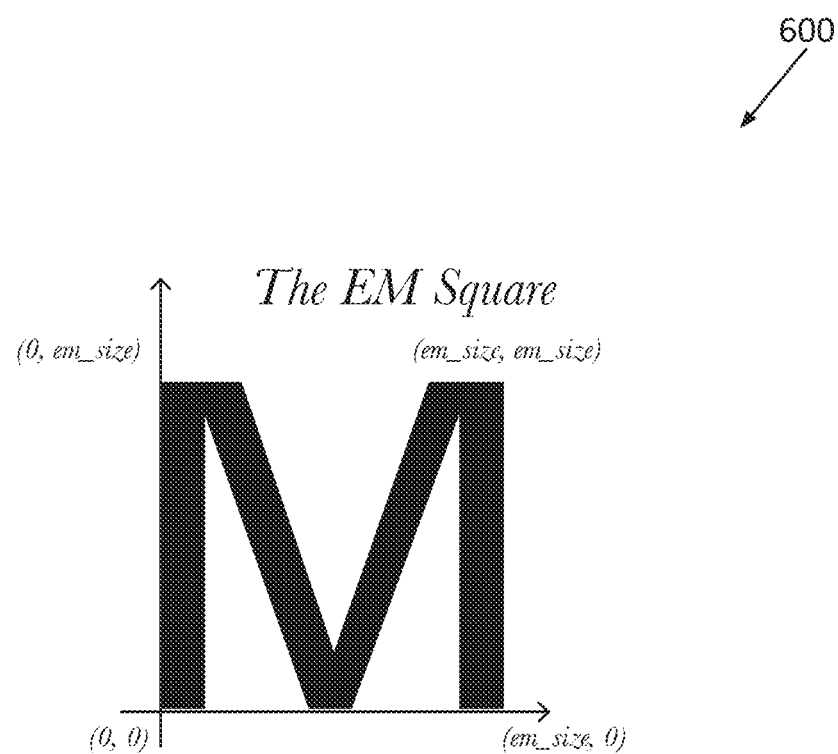
FIG. 15 is a schematic representation of a EM square utilized in designing a phonetical font according to one embodiment of the disclosure.

The phonetical fonts described herein, including the learning aid glyphs, can be created utilizing an existing typeface, such as Roboto by GOOGLE®. Roboto provides a largely geometric mechanical skeleton for glyph development. At the same time, the font features friendly and open curves. Phonetical fonts can be designed to render glyphs at any scale, and under any affine transform, from a single source representation. The rendering can be based on "grid-fitting" to a grid of invisible units and can be based on an imaginary square called the "EM square" 600 as depicted in FIG. 15. Typically, the EM square encloses the capital "M" and most other letters of a typical roman alphabet. The square's size, i.e., the number of grid units on its sides can be utilized as a reference for the size of other letters. In the present disclosure, the phonetical font glyphs can be based on a 4-axis variable font with 2048 units per EM. In an example, the following holds: Ascenders: 2146, Cap-Height: 1456, x-height: 1082, Descenders: −555. Further, in an example, all axes go from 1 to 100. In example phonetical fonts the following specifications in system operation can hold:

Axis 1: The main axis that will show all icons on hover:
  Name: Icons
  Tag: "ICNS"
  Maximum: 100, Minimum: 0
Axis 2: Made for easy access:
  Name: Icon1
  Tag: "ICN1"
  Maximum: 100, Minimum: 0
Axis 3: For icons:
  Name: Icon2
  Tag: "ICN2"
  Maximum: 100, Minimum: 0
Axis 4: For icons:
  Name: Icon3
  Tag: "ICN3"
  Maximum: 100, Minimum: 0
Axis 5: For icons:
  Name: Icon4
  Tag: "ICN4"
  Maximum: 100, Minimum: 0

Figure 16:
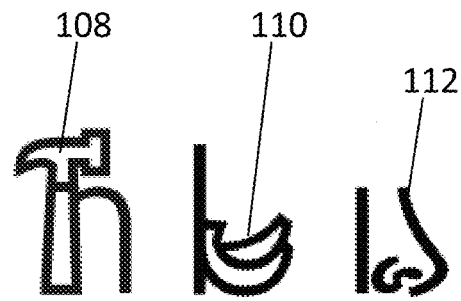
FIG. 16 is a representation of an example phonetical font for the letters "h," "b," and "n" according to one embodiment of the disclosure.

To expedite a glyph design (which can be, or can include, an icon such as an animal image), certain stylistic and design factors can be utilized. For example, one characteristic of example phonetical fonts is a drawn outline form. That is, the letter and/or icon of a glyph can be depicted as a line with images being in outline form, as shown in FIG. 16. In an example, the icon (such as the hammer 109, banana 110, or nose 112 in FIG. 17) line weight does not exceed the vertical stroke weight of the typeface used, such as the aforementioned Roboto, which can be Roboto Light. A second line weight can be half the letter stroke. For example, if a letter stroke is one pica thickness, a secondary width can be six points. In an embodiment, there is no solid fill in the icons or the complete glyph. In an embodiment, such as with the penguin icon shown in FIG. 1, the glyph can include solid filled areas.

Figure 17:
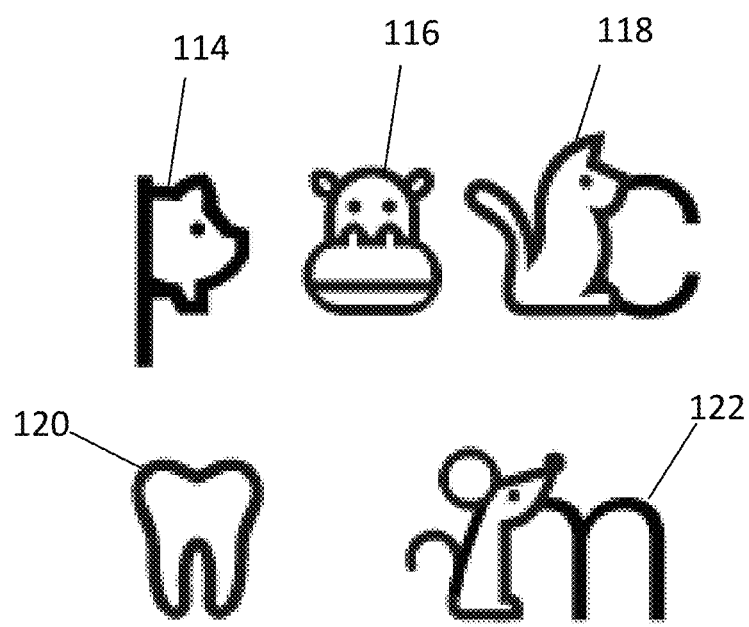
FIG. 17 is a representation of phonetical font for the letters "p," "h," "c," "t," and "m" according to one embodiment of the disclosure.

In an embodiment, the icons and associated glyphs can be constructed along basic geometric forms, such as circles, squares, rectangles, ellipses, dots, combinations thereof. As depicted in FIG. 17, a phonetical font can include a side profile, including a partial side profile of an animal, such as the pig profile depicted at 114. Additionally, a phonetical font can include a frontal view, including a head only view of an animal, such as the hippo depicted at 116. Additionally, a phonetical font can include a full figure profile, such as the cat depicted at 118. In an embodiment, a glyph can include an icon alone, as the tooth depicted at 120. In an embodiment, a phonetical font can include an icon, such as a full profile of an animal, and a letter, as indicated at 122.

When animal representations are utilized, the animal icons can be fit proportionately in the typeface's construction lines. For example, the x-height, baseline, ascension and descension lines can be designed to fit proportionally in the Roboto Light typeface construction lines. Further, the selected object, animal, food, or other image can be presented in various views, such as side view (profile), frontal view, and partial, e.g., three-quarter, view. In an embodiment the choice of view is dependent upon the most identifiable view for a student. That is, the view can be determined based on the most familiar and/or culturally recognizable image. For example, as shown in the examples 700 of FIG. 18, the top row 702 exhibits example frontal views determined to be readily identifiable by students. The second row 704 of FIG. 18 exhibits example side views of determined to be readily identifiable by students, and with respect to the fly of the letter "f," a three-quarter view.

Figure 18:
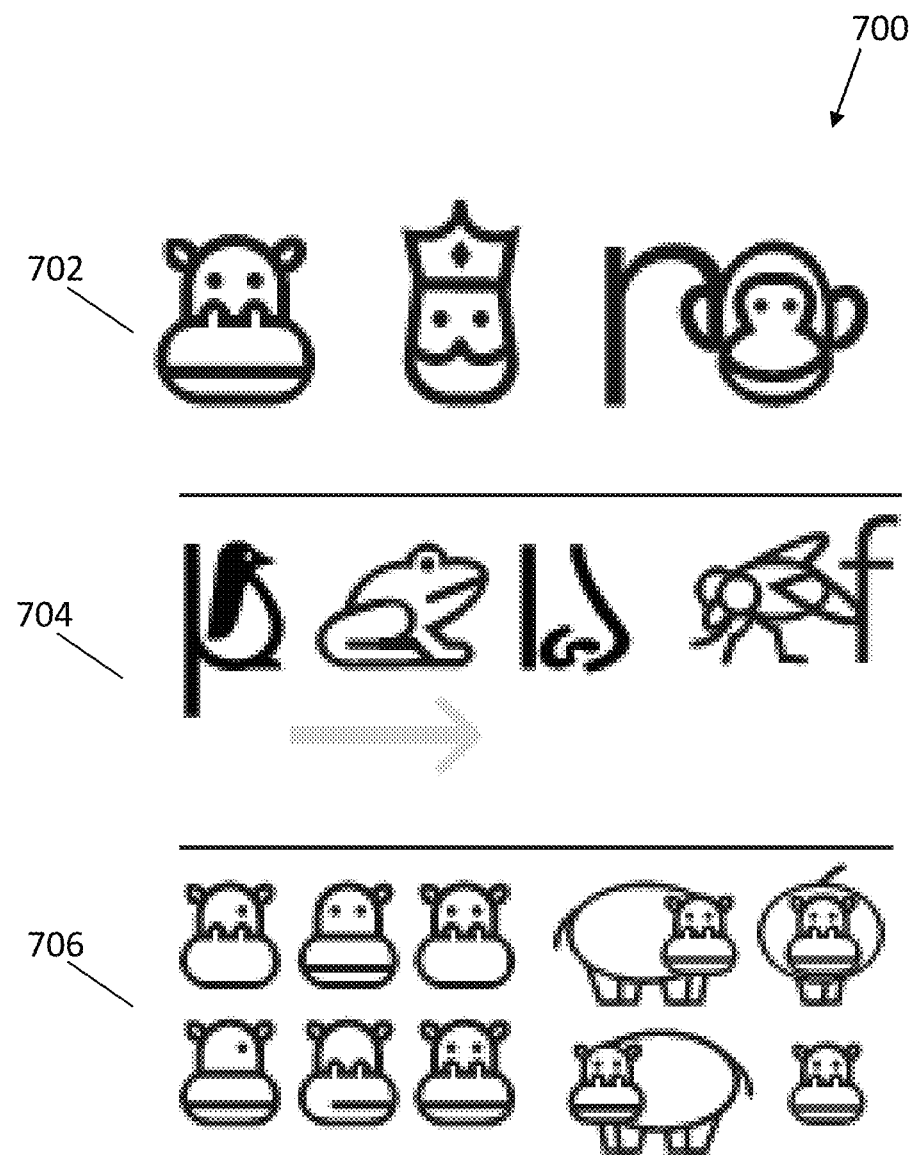
FIG. 18 is a representation of example phonetical font letterforms according to one embodiment of the disclosure.

The bottom rows 706 of FIG. 18 illustrate the concept of iconicity, that is, how much imagery is enough to convey an icon sufficient to enable a student to sound out a letter? In an embodiment, the amount of imagery can be determined on a case-by-case basis. Iconicity refers not only to the number of components used, but how they are used, separately or together. In general, at least enough imagery can be provided to convey an icon's meaning, and ultimately the desired phonetic sound.

Figure 19:
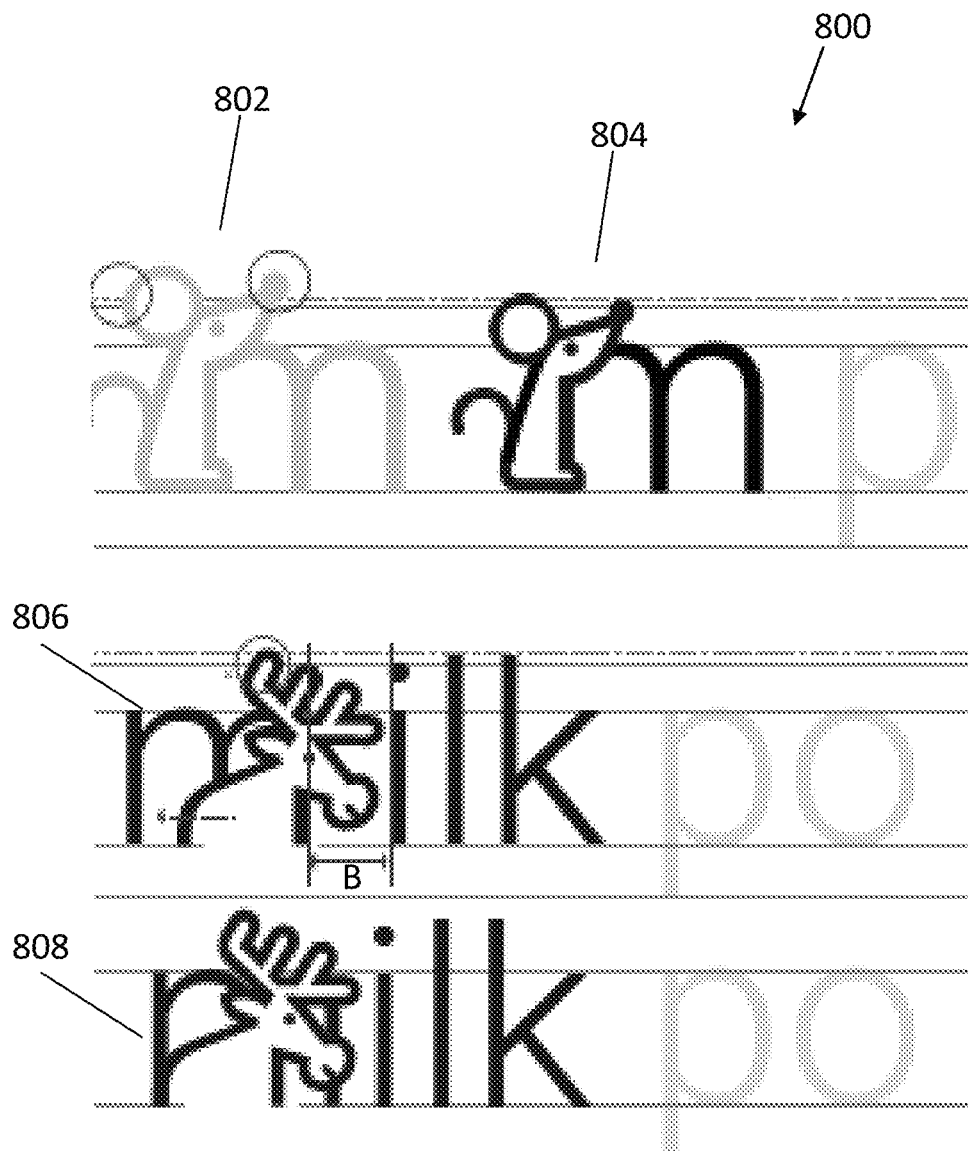
FIG. 19 is a representation of example phonetical font letterform design considerations according to one embodiment of the disclosure.

Referring now to FIG. 19, there is illustrated certain design principles 800 that can be utilized in the phonetical fonts disclosed herein. Because one purpose of a phonetical font including an icon to form a glyph is to build a strong mental association with a specific phonetic sound and an alphabet letter, the design of an icon can be influenced by the letterform itself. That is, in an embodiment, icon designs can occupy the space within and reinforce the ascension, x-height, baseline and descension lines of a letter. By way of example, in a first glyph 802, a mouse icon is not within the letterform structure. A second glyph 804 illustrates the same mouse icon that sized so as to be within the letterform structure. Likewise, the icon size can affect line and letter spacing. For example, the size of the moose icon at 806 extends above the ascension line for the particular letterform utilized, which can cause problems for the preceding line of text copy. Further, the size of the moose icon at 806 can negatively affect letter spacing, as indicated by the spacing dimension "B" in FIG. 19. At 808 a smaller moose icon is indicated, which fits within the letterform lines and provides for more advantageous letter spacing.

Figure 20:
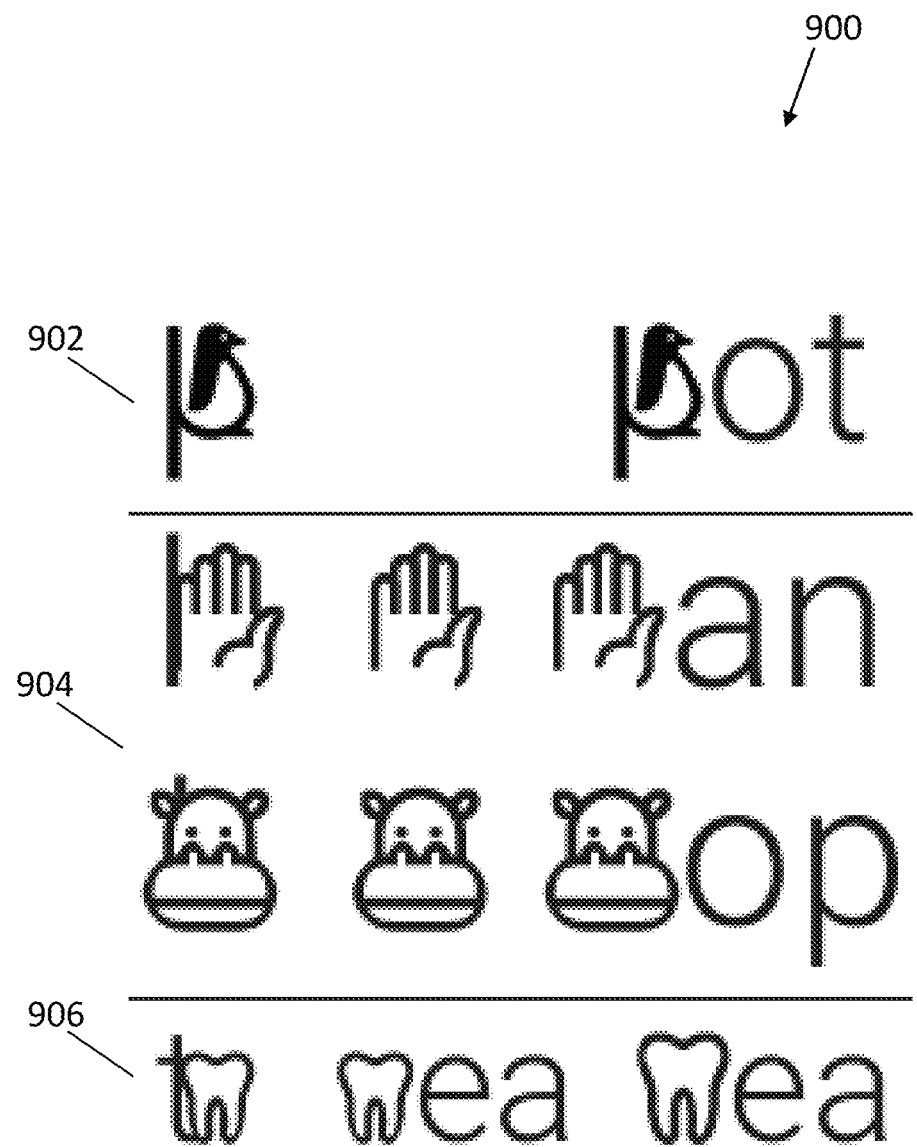
FIG. 20 is a representation of example phonetical font letterforms according to one embodiment of the disclosure.

Referring now to FIG. 20, the system and method of the present disclosure can use various combinations of icon-to-letterform relationships, depicted generally as 900. In general, icon/letterform glyphs serve to render letters with imagery that aids in reading proficiency, such as the penguin icon embedded in a "p" letterform, as shown in the first row 902 of FIG. 20 being useful for sounding the word "pot". However, in some examples an icon, such as an image of an animal, can dominate the glyph, even obscuring much of the letterform, as indicated in second row 904 of FIG. 20. In embodiments, an icon can be displayed with less than 10% of a letterform showing, and in some embodiments, without a letterform at all, as indicated by the tooth icon for the letter "t" in the third row 906 of FIG. 20, useful for sounding out the word "tea," for example.

Figure 21:
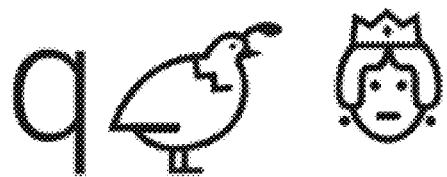
FIG. 21 is a representation of example phonetical font letterforms according to one embodiment of the disclosure.
Figure 21:
Figure 21:
Figure 21:
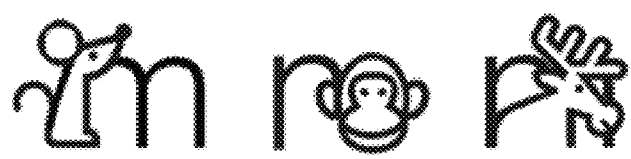
Figure 21:
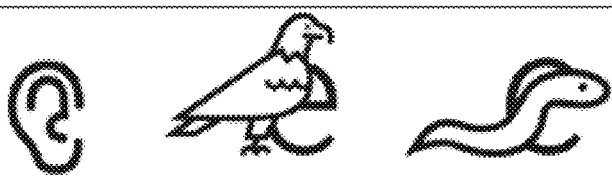
Figure 22:
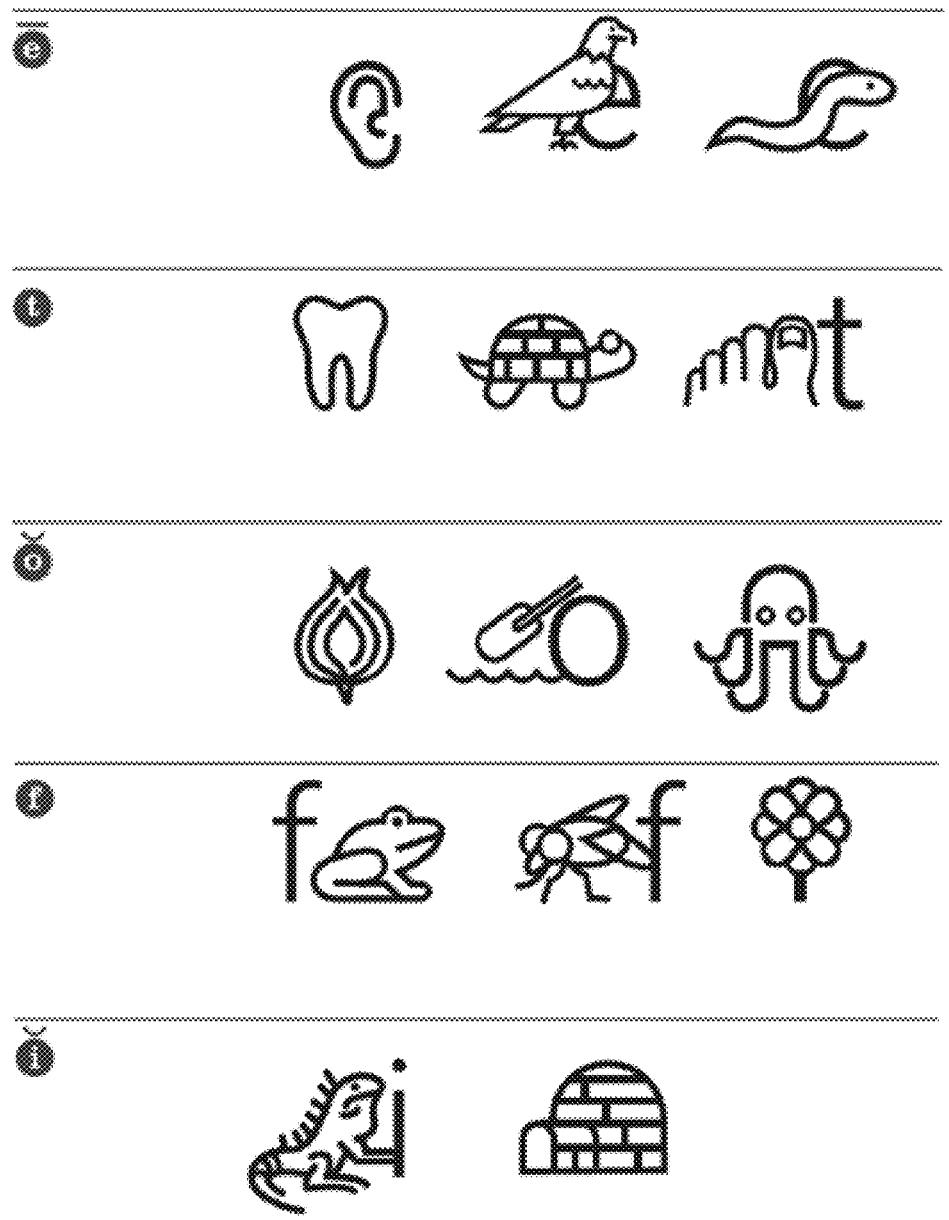
FIG. 22 is a representation of example phonetical font letterforms according to one embodiment of the disclosure.

Example glyphs of icons and letterforms are shown in FIGS. 21 and 22. A partial glyph/icon inventory is shown in FIG. 23.

Third-party font developers can construct their own font/ glyph combinations for use on the system described herein using the aforementioned techniques. A font built upon a different base font using glyphs referencing different domains that would better assist the user with their reading objectives. For example, a base font focused on dyslexia using glyphs of vehicles. The font would use the aforementioned axes for animation.

Figure 24:
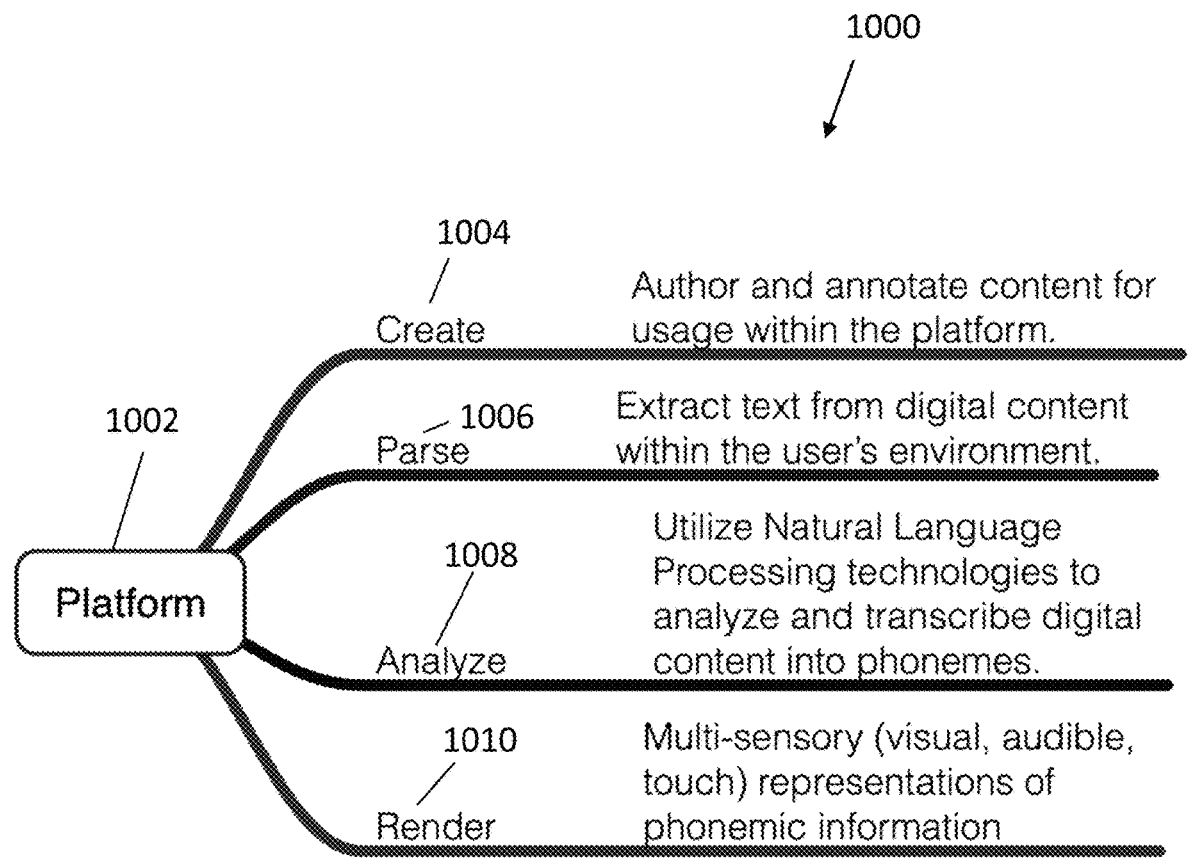
FIG. 24 is a schematic flow diagram for a representative system according to one embodiment of the disclosure.

Referring now to FIG. 24, there is shown a schematic flow diagram for a representative system 1000 including a system platform 1002, which can include, access, and/or utilize, for example, a web browser, web browser extension and API, and the like. In an embodiment, an API is a computing interface that facilitates a range of user interactions for increasing reading proficiency. In an embodiment, the platform 1002 facilitates the conversion of digital content by applying a variable font to the digital content in order to enhance the teaching of reading. In the illustrated example, the platform 1002 includes the provision of, or the creation of, content 1004 for usage within the platform. Provision of content 1004 can be, for example, by accessing digital text on an electronic device. Creation of content 1004 can include, for example, digital text creation and editing. The digital text can be a body of digital text, including longer forms, such as an article, essay, or a story. The platform 1002 can also parse 1006 the digital content from within the user's environment. Parsing can involve, for example, extracting all or a portion of text from digital content. Parsing can involve, for example, extracting all or a portion of text from the body of digital text. Extraction of text can be achieved by a user selecting text for analyzing by the method and system herein. Once text is selected, the platform 1002 can analyze 1008 the extracted text for transcription into phonemes, which can be associated with phonetical fonts, as described herein. The analyze 1008 step can utilized natural language processing (NLP) to produce the phonetical fonts, including associated phonemes. Once the phonetical fonts are determined, the platform 1002 can render 1010 the text, including the phonetical fonts, into a representation of the phoneme. The representation can be multi-sensory, and can include visual, audible, and/or tactile representations.

Figure 25:
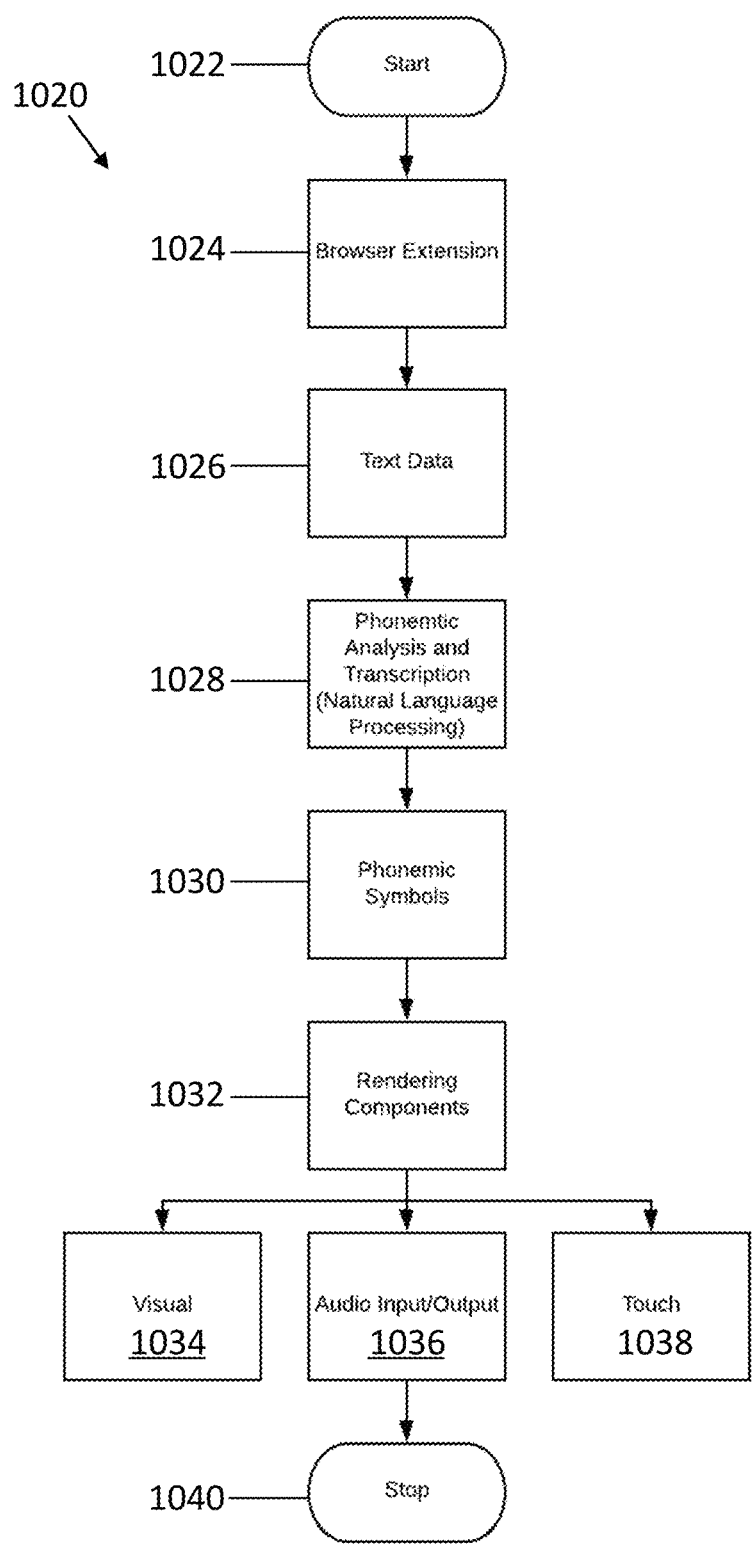
FIG. 25 is a schematic flow diagram for a representative method according to one embodiment of the disclosure.

Referring now to FIG. 25, there is shown a schematic flow diagram for a representative method 1020 that can be practiced according to the system 1000 described herein. At 1022 the method starts. The start 1022 can include reading, authoring, annotating, or otherwise creating digital content in the form of text. At 1024 a user using a web browser can initialize a browser extension to activate processing with the API. Utilizing the browser extension, at 1026 digital content is sent to the API for parsing and extraction. At 1028 phonemic analysis is performed on the extracted text. Phonemic analysis can be performed by natural language processing. The phonemic analysis can produce phonemic symbols at 1030, which phonemic symbols can be phonetical fonts as disclosed herein, and can be rendered at 1032 into multisensory components, including one or all of visual representations 1034, audible representations 1036 (both input and output), and tactile representations 1038. Once the rendering is complete, the process stops at 1040.

Figure 26:
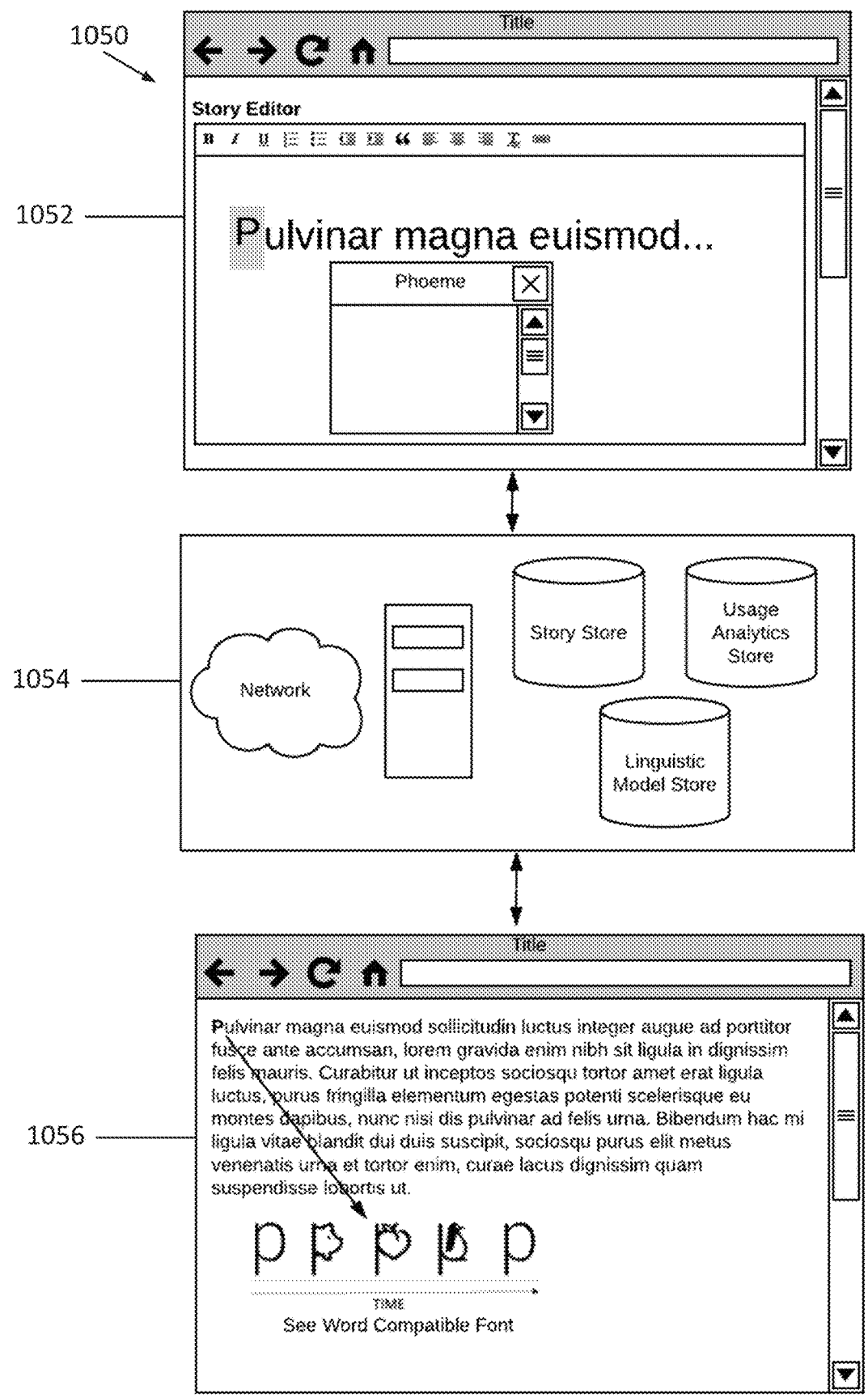
FIG. 26 is a schematic process flow diagram for a representative method according to one embodiment of the disclosure.

A representative story creating and/or editing process 1050 is depicted at FIG. 26. At 1052 a digital text can be created or edited as a story for analysis and rendering by the system and method of the present disclosure. In a representative embodiment, an author can annotate text to direct the rendering of system-compatible font.

At 1054 the system, via system components such as a processor and network connection, which can be a wired or wireless connection to the internet, can store the digital text in a story store for usage in other parts of the system. The system can also have components for usage analytics as well as linguistic models for application to the analysis of the digital text.

At 1056 stories are presented to users in a system-compatible font in which letter or combinations of letters will react to user selection, that is, interactions such as touching, clicking, rolling over, curser hovering, or by any other suitable interaction. Upon the user selection, the selected letter or combination of letters will render into one or more phonetical fonts, which can include glyphs, including a series of glyphs as indicated at 1056. The series of glyphs can render in time, as disclosed herein, such that a different glyph renders sequentially in time. Audio can also be played of the selected phoneme(s).

Figure 27:
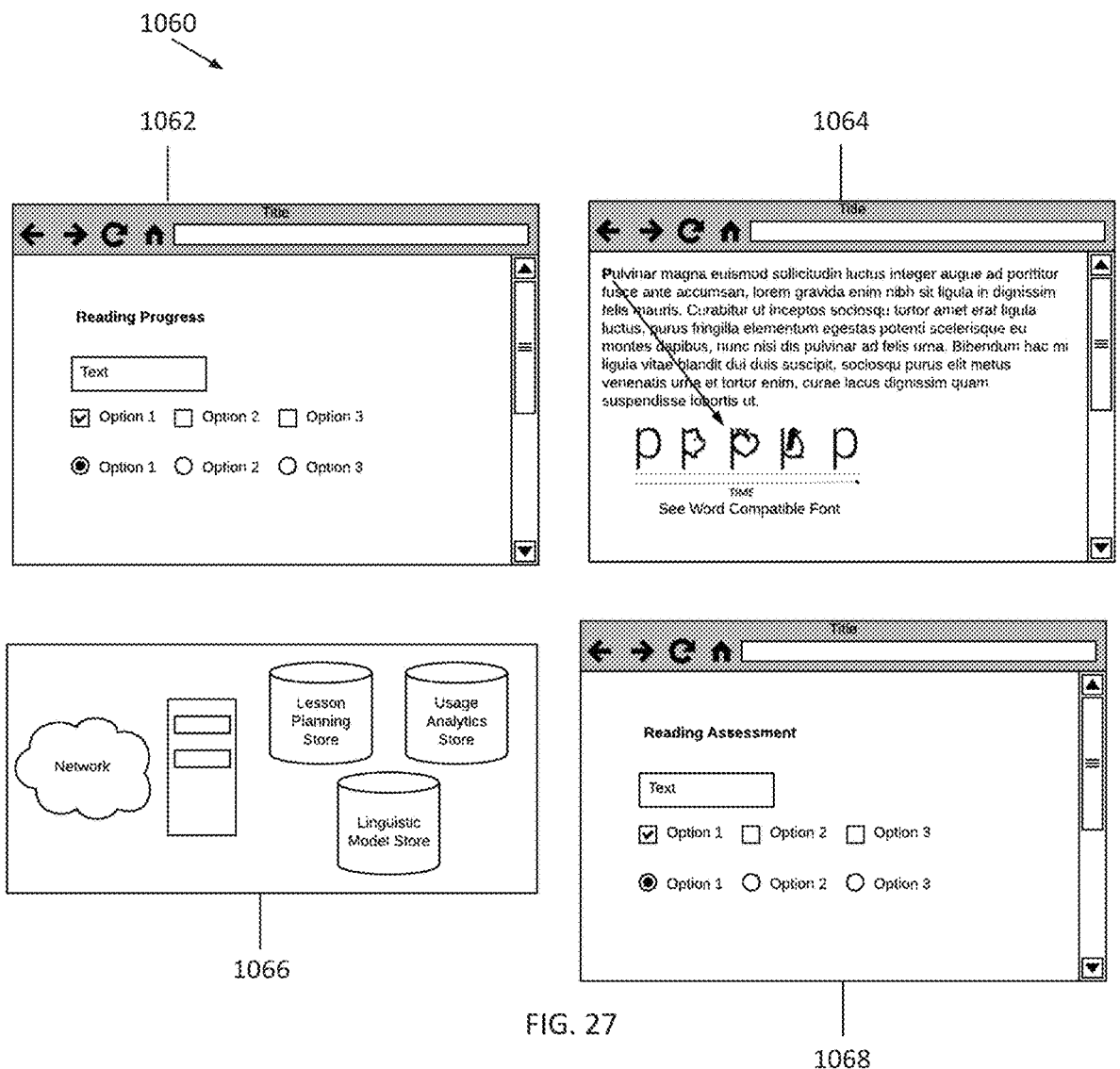
FIG. 27 is a schematic process flow diagram for a representative method according to one embodiment of the disclosure.

A representative lesson plan process 1060 is depicted at FIG. 27. At 1062 a user completes a reading assessment to gauge the current level of reading proficiency, including comprehension, and/or determine goals. At 1064, via system components such as a processor and network connection, which can be a wired or wireless connection to the internet, the reading assessment data is stored along with system usage analytics and the linguistics model. The data can be used by the system machine learning processes to build a customized curriculum to increase reading proficiency. At 1066, stories, as discussed above, are presented to users in a system-compatible font. As above, letters will render into one or more phonetical fonts, which can be glyphs, including a series of glyphs as indicated at 1056. The series of glyphs can render in time, as disclosed herein, such that a different glyph renders sequentially in time. Audio can also be played of the selected phoneme(s). At 1068 users complete assessments to ascertain progress on the curriculum. This data can be used to continue developing the machine learning lesson planning across the system platform.

It is noted that terms like "specifically," "preferably," "commonly," and "typically" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure. It is also noted that terms like "substantially" and "about" are utilized herein to represent the inherent degree of uncertainty that may be attributed to any quantitative comparison, value, measurement, or other representation.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure. For example, in an embodiment, a system and method of the disclosure can incorporate augmented reality (AR), virtual reality (VR) and other simulation technologies. For example, a user could hold his or her phone up to a sign, such as a stop sign, and the system processes perceived text content via the API to render as a system-compatible phonetical font into real world objects perceived by the user across multiply sensory modalities including visual, auditory and haptic.

All documents cited in the Detailed Description of the Disclosure are, in relevant part, incorporated herein by reference; the citation of any document is not to be construed as an admission that it is prior art with respect to the present disclosure. To the extent that any meaning or definition of a term in this written document conflicts with any meaning or definition of the term in a document incorporated by reference, the meaning or definition assigned to the term in this written document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method for improving reading proficiency in persons in need of improvement, the method comprising the steps of:
    storing a set of phonemes, wherein each phoneme of the set of phonemes is associated with a plurality of icons, and each icon of the plurality of icons depicts an object whose voiced description begins with that phoneme;
    displaying a body of digital text on an electronic device;
    extracting a selected portion of digital text from the body of digital text, wherein the selected portion of digital text comprises a letterform;
    analyzing the selected portion by natural language processing to determine a phoneme of the selected portion;
    producing a glyph by combining an icon of the plurality of icons for the phoneme with the letterform; and
    while displaying the body of digital text, morphing the selected portion to instead display the glyph.

2. The method of claim 1, wherein the body of digital text is provided via a browser extension utilizing an application programming interface.

3. The method of claim 1, wherein the selected portion of text is selected by a user of the body of digital text.

4. The method of claim 1, wherein the provided body of digital text is created via a browser extension utilizing an application programming interface.

5. The method of claim 1, further comprising:
    producing a subsequent glyph by coming a subsequent icon of the plurality of icons for the phoneme with the letterform; and while displaying the body of digital text, morphing the selected portion to instead display the subsequent glyph;
wherein the object associated with the glyph and the object associated with the subsequent glyph are different objects.

6. The method of claim 5, further comprising morphing the selected portion to instead display the subsequent glyph in response to receiving a user input.

7. The method of claim 5, further comprising morphing the selected portion to instead display the subsequent glyph in response to the passage of a configured time interval.

8. The method of claim 5, further comprising:
associating audio data with each of the set of phonemes, wherein the audio data comprises playable audio corresponding to each phoneme; and
when morphing the selected portion to instead display the glyph, the subsequent glyph, or any further subsequent glyph, playing the audio data that corresponds to the phoneme of the selected portion.

9. The method of claim 1, further comprising, when producing the glyph:
overlaying the icon on a first portion of the letterform; and
sizing and positioning the icon to fit within a letterform structure of the letterform.

10. The method of claim 9, wherein a second portion of the letterform upon which the icon is not overlaid comprises about 50% or more of the letterform.

11. A method for rendering a phonetical font to aid in voicing phonemes, the method comprising the steps of:
storing a set of phonemes, wherein each phoneme of the set of phonemes is associated with a letterform of a plurality of letterforms and a plurality of icons, and each icon of the plurality of icons depicts an object whose voiced description begins with that phoneme;
creating a plurality of glyphs for each letterform of the plurality of letterforms by, for each icon of each phoneme associated with that letterform, combining that icon with that letterform;
creating a variable font based upon the plurality of glyphs and the plurality of letterforms, wherein the variable font is configured to selectively display, for each letterform of the plurality of letterforms, the letterform or one of the plurality of glyphs corresponding to the letterform;
displaying a body of digital text on, and providing the variable font to, an electronic device;
receiving, from the electronic device, a user input identifying a selected portion of the body of digital text, the selected portion comprising a letterform;
analyzing the selected portion to determine a phoneme of the selected portion;
causing the electronic device to apply the variable font to morph the selected portion to instead display a glyph, of the plurality of glyphs, that corresponds to the selected portion.

12. The method of claim 11, further comprising receiving the user input from the electronic device and causing the electronic device to apply the variable font via a browser extension configured on the electronic device.

13. The method of claim 11, further comprising receiving the user input from the electronic device and causing the electronic device to apply the variable font via an application programming interface in communication with the electronic device.

14. The method of claim 11, further comprising analyzing the selected portion to determine the phoneme using a natural language processing function.

15. The method of claim 11, further comprising, when creating the plurality of glyphs for each letterform:
combining each icon of each phoneme with that letterform by overlaying that icon on a first portion of that letterform; and
sizing and positioning that icon to fit within a letterform structure of that letterform.

16. The method of claim 15, wherein a second portion of that letterform upon which the icon is not overlaid comprises about 50% or more of that letterform.

17. The method of claim 15, further comprising sizing and positioning that icon to fit within the letterform structure of that letterform by grid-fitting that icon to that letterform.

18. A system for rendering a phonetical font, the system comprising:
a storage device configured to store a set of phonemes wherein each phoneme of the set of phonemes is associated with a length that describes whether the phoneme is long or short;
a natural language processing function configured to identify phonemes within text a processor, the processor comprising memory and executable instructions for:
receiving a user input from an electronic device, wherein the user input identifies a selected portion of digital text, and wherein the selected portion of digital text comprises a letterform;
determining a phoneme of the selected portion using the natural language processing function;
causing the electronic device to display a morph of the letterform based upon the length associated with the phoneme of the selected portion, wherein the morph comprises:
increasing a display width of the letterform when the length of the phoneme is long; and
decreasing the display width of the letterform when the length of the phoneme is short.

19. The system of claim 18, wherein the processor comprises a story store, a usage analytics store and a linguistic model store.

20. The system of claim 18, the processor further comprising executable instructions for:
creating a variable font for a plurality of letterforms based upon the set of phonemes, wherein the variable font is configured to selectively display each letterform of the plurality of letterforms with the display width increased or decreased;
providing the variable font to the electronic device;
causing the electronic device to display the morph of the letterform by causing the electronic device to selectively apply the variable font based upon the length associated with the phoneme of the selected portion.

* * * * *